US011438121B2

(12) United States Patent
Wernersson et al.

(10) Patent No.: US 11,438,121 B2
(45) Date of Patent: Sep. 6, 2022

(54) SOUNDING REFERENCE SIGNAL POWER CONTROL IN NEW RADIO

(71) Applicant: Telefonaktiebolaget LM Ericsson (publ), Stockholm (SE)

(72) Inventors: Niklas Wernersson, Kungsängen (SE); Eleftherios Karipidis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 153 days.

(21) Appl. No.: 16/467,259

(22) PCT Filed: Apr. 11, 2019

(86) PCT No.: PCT/EP2019/059235
§ 371 (c)(1),
(2) Date: Jun. 6, 2019

(87) PCT Pub. No.: WO2019/197526
PCT Pub. Date: Oct. 17, 2019

(65) Prior Publication Data
US 2021/0083824 A1    Mar. 18, 2021

Related U.S. Application Data

(60) Provisional application No. 62/657,491, filed on Apr. 13, 2018.

(51) Int. Cl.
*H04L 5/00*          (2006.01)
*H04W 52/22*      (2009.01)

(52) U.S. Cl.
CPC .......... *H04L 5/0051* (2013.01); *H04L 5/0023* (2013.01); *H04W 52/226* (2013.01)

(58) Field of Classification Search
None
See application file for complete search history.

(56) References Cited

U.S. PATENT DOCUMENTS 9,059,749 B2 *   6/2015  Imamura .................. H04B 1/04
10,383,067 B2 *  8/2019  Lin ...................... H04W 52/367
(Continued)

FOREIGN PATENT DOCUMENTS

EP     2663136 A1    11/2013

OTHER PUBLICATIONS

Catt, Power Scaling for simultaneous SRS transmission on multiple cells, 3GPP TSG RAN WG1 Meeting #65 (Year: 2011).*

(Continued)

*Primary Examiner* — Ayaz R Sheikh
*Assistant Examiner* — Tarell A Hampton
(74) *Attorney, Agent, or Firm* — Sage Patent Group

(57) ABSTRACT

Embodiments provide methods, network nodes, and wireless devices for sounding reference signal (SRS) power control in New Radio (NR). According to one aspect, a wireless device (WD) is configured to receive signaling from the network node that identifies a first sounding reference signal, SRS, configuration defining an SRS resource set comprising one or more SRS resources. The WD is further configured to determine a first transmission power intended for SRS transmission, the determining being based at least in part on the first SRS configuration. The WD is also configured to determine a second transmission power for at least one antenna port related to the SRS resource set based on the first transmission power and according to a rule dependent on the first SRS configuration. The WD is also configured to transmit SRS on the at least one antenna port with the second transmission power.

18 Claims, 11 Drawing Sheets

(56) References Cited

U.S. PATENT DOCUMENTS

| | | | | |
|---|---|---|---|---|
| 2010/0246561 | A1* | 9/2010 | Shin | H04L 5/0096 370/345 |
| 2011/0096815 | A1* | 4/2011 | Shin | H04W 52/146 375/219 |
| 2012/0039273 | A1* | 2/2012 | Nam | H04L 5/001 370/329 |
| 2012/0300740 | A1* | 11/2012 | Iwai | H04J 13/0062 370/329 |
| 2013/0083683 | A1* | 4/2013 | Hwang | H04L 5/0053 370/252 |
| 2013/0128833 | A1* | 5/2013 | Lee | H04W 52/545 370/329 |
| 2013/0272257 | A1* | 10/2013 | Takaoka | H04B 7/0447 370/329 |
| 2015/0031410 | A1* | 1/2015 | Lim | H04W 52/244 455/522 |
| 2016/0183203 | A1* | 6/2016 | Larsson | H04W 52/386 370/329 |
| 2016/0205632 | A1* | 7/2016 | Yi | H04W 52/34 455/522 |
| 2016/0337987 | A1* | 11/2016 | Yi | H04W 52/34 |
| 2017/0013564 | A1* | 1/2017 | Yi | H04W 52/36 |
| 2017/0222856 | A1* | 8/2017 | Dinan | H04L 27/0006 |
| 2017/0223564 | A1* | 8/2017 | Dinan | H04W 52/50 |
| 2017/0223640 | A1* | 8/2017 | Dinan | H04W 24/10 |
| 2017/0223675 | A1* | 8/2017 | Dinan | H04W 72/042 |
| 2017/0264402 | A1* | 9/2017 | Papasakellariou | H04W 74/006 |
| 2017/0280469 | A1* | 9/2017 | Park | H04W 76/14 |
| 2018/0049137 | A1* | 2/2018 | Li | H04W 52/242 |
| 2018/0103433 | A1* | 4/2018 | Li | H04W 52/146 |
| 2018/0115957 | A1* | 4/2018 | Lin | H04W 52/42 |
| 2018/0131425 | A1* | 5/2018 | Li | H04W 72/1284 |
| 2018/0132197 | A1* | 5/2018 | Lin | H04W 52/42 |
| 2018/0279376 | A1* | 9/2018 | Dinan | H04W 74/0833 |
| 2018/0338289 | A1* | 11/2018 | Reial | H04W 52/028 |
| 2018/0367255 | A1* | 12/2018 | Jeon | H04L 5/0053 |
| 2018/0368174 | A1* | 12/2018 | Jeon | H04W 72/0446 |
| 2019/0109679 | A1* | 4/2019 | Liu | H04B 7/0417 |
| 2019/0312617 | A1* | 10/2019 | Wernersson | H04L 25/0226 |
| 2020/0120619 | A1* | 4/2020 | Manolakos | H04W 52/325 |
| 2020/0187128 | A1* | 6/2020 | Yao | H04W 52/146 |

OTHER PUBLICATIONS

3GPP TS 38.213 V15.1.0; 3rd generation Partnership Project; Technical Specification Group Radio Access Network NR; Physical layer procedures for control (Release 15); Mar. 2018, consisting of 77-pages.

International Search Report and Written Opinion dated Jun. 19, 2019 for International Application No. PCT/EP2019/059235 filed Apr. 11, 2019 consisting of 15-pages.

3GPP TSG RAN WG1 Meeting #92bis R1-1803641; Title: Remaining details of UL power control design; Agenda Item 7.1.6.1; Source: Huawei, HiSilicon; Document for: Discussion and decision; Location and Date: Sanya, China, Apr. 16-20, 2018, consisting of 7-pages.

3GPP TSG RAN WG1 NR Ad-Hoc#2 R1-1710184; Title: UL beam management for NR MIMO; Agenda Item: 5.1.2.2.1; Source: ZTE; Document for: Discussion and Decision; Location and Date: Qingdao, P.R. China, Jun. 27-30, 2017, consisting of 8-pages.

* cited by examiner

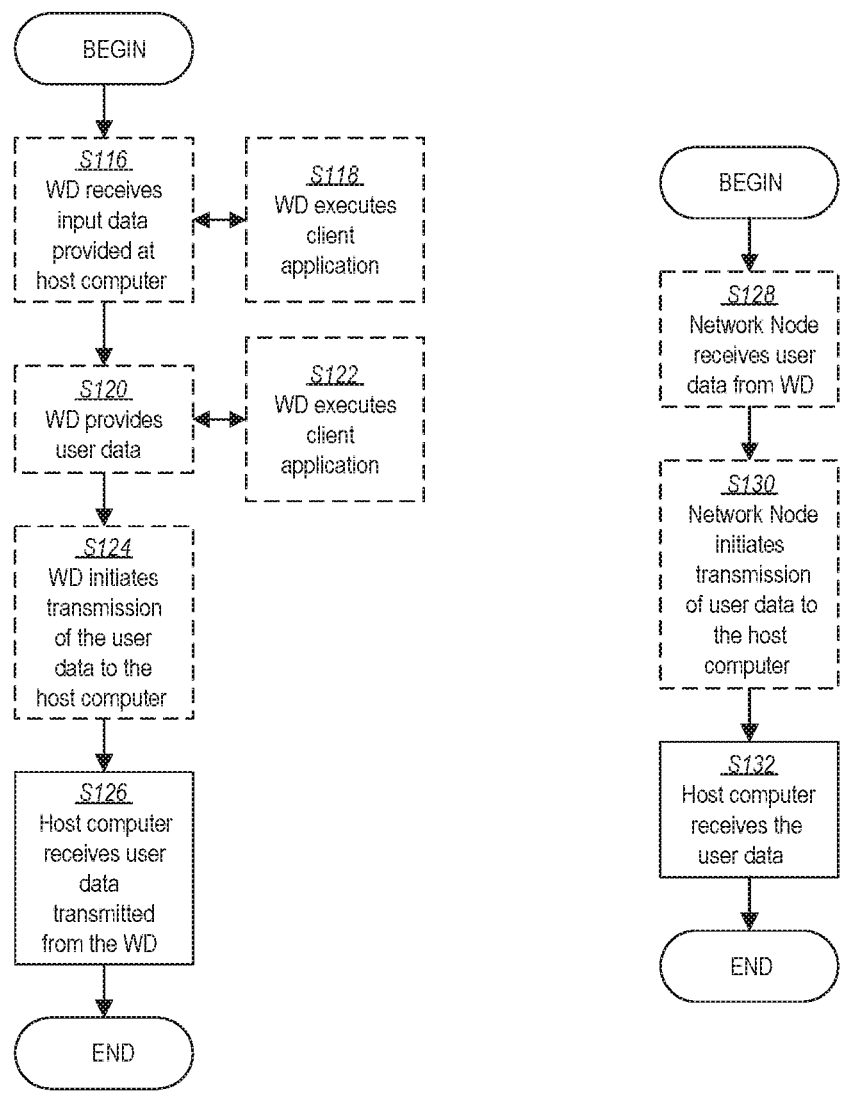

SOUNDING REFERENCE SIGNAL POWER CONTROL IN NEW RADIO

CROSS-REFERENCE TO RELATED APPLICATIONS

This application is a Submission Under 35 U.S.C. § 371 for U.S. National Stage Patent Application of International Application No.: PCT/EP2019/059235, filed Apr. 11, 2019 entitled "SOUNDING REFERENCE SIGNAL POWER CONTROL IN NEW RADIO," which claims priority to U.S. Provisional Application No. 62/657,491, filed Apr. 13, 2018, entitled "SOUNDING REFERENCE SIGNAL POWER CONTROL IN NEW RADIO," the entireties of both of which are incorporated herein by reference.

TECHNICAL FIELD

The present disclosure relates to wireless communications, and in particular, to sounding reference signal (SRS) power control in New Radio (NR).

BACKGROUND

The next generation mobile wireless communication system (5G) or new radio (NR), will support a diverse set of use cases and a diverse set of deployment scenarios. The latter includes deployment at both low frequencies (100s of MHz), similar to long term evolution (LTE) today, and very high frequencies (mm waves in the tens of GHz).

Codebook-Based Precoding

Multi-antenna techniques can significantly increase the data rates and reliability of a wireless communication system. The performance may be improved if both the transmitter and the receiver are equipped with multiple antennas, which results in a multiple-input multiple-output (MIMO) communication channel. Such systems and/or related techniques are commonly referred to as MIMO.

The NR standard is currently being specified. A core component in NR is the support of MIMO antenna deployments and MIMO related techniques. NR will support uplink (UL, i.e., from the wireless device to the network node) MIMO with at least 4 layer spatial multiplexing using at least 4 antenna ports with channel dependent precoding. The spatial multiplexing mode is aimed for high data rates in favorable channel conditions.

An illustration of the spatial multiplexing operation is provided in FIG. 1 where cyclic prefix-orthogonal frequency division multiplexing (CP-OFDM) is used on the uplink. As shown, the information carrying symbol vector 's' is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

The received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or can be frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the WD. In addition, the precoder matrix may also be selected to strive for orthogonalizing the channel, meaning that after proper linear equalization at the WD, the inter-layer interference is reduced.

One example method for a WD to select a precoder matrix W can be to select the $W_k$ that maximizes the Frobenius norm of the hypothesized equivalent channel:

$$\max_k \left\| \hat{H}_n W_k \right\|_F^2$$

where $\hat{H}_n$ is a channel estimate, possibly derived from SRS, $W_k$ is a hypothesized precoder matrix with index k and $\hat{H}_n W_k$ is the hypothesized equivalent channel.

In closed-loop precoding for the NR uplink, the total radiated power (TRP) transmits, based on channel measurements in the reverse link (uplink), TPMI to the WD that the WD should use on its uplink antennas. The base station (gNodeB) configures the WD to transmit SRS according to the number of WD antennas the base station would like the WD to use for uplink transmission to enable the channel measurements. A single precoder that is supposed to cover a large bandwidth (wideband precoding) may be signaled.

Other information than TPMI is generally used to determine the UL MIMO transmission state, such as SRS resource indicators (SRIs) as well as transmission rank indicator (TRIs). These parameters, as well as the modulation and coding scheme (MCS), and the uplink resources where the physical uplink shared channel (PUSCH) is to be transmitted, are also determined by channel measurements derived from SRS transmissions from the WD. The transmission rank, and thus the number of spatially multiplexed layers, is reflected in the number of columns of the precoder W. For efficient performance, it is useful to select a transmission rank that matches the channel properties.

Non-Codebook Based Precoding

NR also supports non-codebook based transmission/precoding for the physical uplink shared channel (PUSCH) in addition to codebook based precoding. For this scheme, a set of SRS resources are transmitted where each SRS resource corresponds to one SRS port precoded by some precoder selected by the WD. The gNB can then measure the transmitted SRS resources and feedback to the WD one or multiple SRS resource indications (SRI) to instruct the WD to perform the PUSCH transmission using the precoders corresponding to the referred SRS resources. The rank in this case will be determined from the number of SRIs fed back to the WD.

By configuring the WD with the higher layer parameter SRS-AssocCSIRS and with the higher layer parameter ulTxConfig set to 'NonCodebook', the WD may be configured with a non-zero power channel state information reference signal (NZP CSI-RS) to utilize reciprocity to create the precoders used for SRS and PUSCH transmission.

Hence, by measuring on the specified CSI-RS, the WD will be able to perform gNB transparent precoding based on reciprocity.

Another mode of operation is to instead let the WD choose the precoders such that each SRS resource corresponds to one WD antenna. Hence, in this case, the SRS resource would be transmitted from one WD antenna at the time and the SRIs would hence correspond to different antennas. Thus, by choosing the WD precoders this way, the gNB will be able to perform antenna selection at the WD by referring to the different SRIs which in turn will correspond to different antennas. To summarize, non-codebook based precoding includes both antenna selection, and gNB transparent reciprocity based precoding.

SRS Transmission in NR

Sounding reference signals (SRSs) are used for a variety of purposes in LTE and are expected to serve even more purposes in NR. One use for SRS is for uplink channel state estimation, allowing channel quality estimation to enable uplink link adaptation (including determination of which MCS the WD should transmit with) and/or frequency-selective scheduling. In the context of uplink MIMO, SRSs can also be used to determine precoders and a number of layers that will provide good uplink throughput and/or signal to interference plus noise ratio (SINR) when the WD uses them for transmission on its uplink antenna array. Additional uses include power control, uplink timing advance adjustment, beam management, and reciprocity-based downlink (DL) precoding.

Unlike LTE 3GPP Rel-14, at least some NR WDs may be capable of transmitting multiple SRS resources. This is similar conceptually to multiple CSI-RS resources on the downlink (DL, i.e., from the network node to the WD): an SRS resource comprises one or more antenna ports, and the WD may apply a beamformer and/or a precoder to the antenna ports within the SRS resource such that they are transmitted with the same effective antenna pattern. A primary motivation for defining multiple SRS resources in the WD is to support analog beamforming in the WD where a WD can transmit with a variety of beam patterns, but only one at a time. Such analog beamforming may have relatively high directivity, especially at the higher frequencies that can be supported by NR.

In NR, the SRS sequence is a WD-specifically configured Zadoff-Chu based sequence and an SRS resource consists of 1, 2 or 4 antenna ports. Another feature supported by NR is repetition of symbols within the resource with factor 1, 2 or 4. This means that the transmission may be extended to multiple OFDM symbols which is intended to improve the UL coverage of the SRS. An SRS resource may always span 1, 2 or 4 adjacent OFDM symbols and all ports may be mapped to each symbol of the resource. SRS resources may be mapped within the last 6 OFDM symbols of an uplink slot. SRS resources may be mapped on either every second or every fourth subcarrier, that is, with so-called comb levels of either 2 or 4. SRS resources may be configured in SRS resource sets which contain one or multiple SRS resources. Some use cases and possible configurations of SRS are presented in the following sections in terms of a set of physical resources as presented in FIG. 2.

Higher Layer Parameter SRS-SetUse Set to 'Codebook'

In one case, a codebook based UL MIMO is chosen where one or two SRS resources can be configured within an SRS resource set and each SRS resource contains up to 4 antenna ports. Three potential configurations are illustrated in FIG. 3 where it is assumed that an SRS resource set containing two SRS resources have been configured. Each SRS resource is represented with different shading in the figures. In these examples, the comb level is two, and each resource is configured with a different comb offset. Note that:

In example 1 the SRS resources are transmitted in different OFDM symbols.

In example 2 the SRS resources are transmitted in the same OFDM symbol.

In example 3 a repetition factor of 2 is configured and the SRS resources start in different OFDM symbols and are transmitted simultaneously in one OFDM symbol.

Higher Layer Parameter SRS-SetUse Set to 'NonCodebook'

One intended use case is non-codebook based UL MIMO where up to four SRS resources can be configured within an SRS resource set and each SRS resource contains 1 antenna port. Three potential configurations are illustrated in FIG. 4 where it is assumed that an SRS resource set containing four SRS resources have been configured. Each SRS resource is represented with different shading in the figures. In these examples, the comb level is four, and each resource is configured with a different comb offset. For the examples, note:

In example 1 the SRS resources are transmitted in different OFDM symbols.

In example 2 the SRS resources are transmitted in the same OFDM symbol.

In example 3 a repetition factor of 2 is configured and the SRS resources start in different OFDM symbols and pairs of resources are transmitted simultaneously in some OFDM symbols.

Higher Layer Parameter SRS-SetUse set to 'beamManagement'

One intended use case is beam management where several SRS resources can be configured within potentially several SRS resource sets and each SRS resource contains 1 antenna port. At each OFDM symbol, only one SRS resource in each of the SRS sets can be transmitted. Three potential configurations are illustrated in FIG. 5 where the SRS resource sets are illustrated. Each SRS resource is represented with a different shading in the figures. In these examples, the comb level is four, and each resource is configured with a different comb offset. Note that:

In example 1a the 4 SRS resources from the same SRS resource set are transmitted in different OFDM symbols of the same slot.

In example 2 the SRS resources from different SRS resource sets are transmitted in the same OFDM symbols.

In example 1 b the 4 resources from the same SRS resource set are spread out over multiple slots.

Higher Layer Parameter SRS-SetUse Set to 'AntennaSwitching'

Another intended use case is to obtain knowledge of the entire downlink MIMO channel matrix from uplink measurements under the assumption of uplink-downlink channel reciprocity. As WDs have typically more receive (RX) chains than transmit (TX) chains, the procedure of antenna switching is used to sound all antennas. Either two or four SRS resources are configured within an SRS resource set, for the case that the WD has either double or quadruple, respectively, more RX than TX chains. Three potential configurations are illustrated in FIG. 6. Each SRS resource is represented with a different shading in the figures. In these examples, the comb level is two and all resources are configured with the same comb offset. Note that:

In example 1a, two SRS resources from the same SRS resource set are transmitted in different OFDM symbols of the same slot. The resources are either 1-port or 2-port for the case of either 1 transmitter/2 receivers (1T2R) or 2 transmitter/4 receivers (2T4R), respectively. Different antenna ports are mapped to different resources. A guard period of at least one symbol may be required due to the transient effects of the power when antennas are switched. Both cases with and without repetition factor are illustrated, in left and right of the upper part of the figure, respectively.

In example 1b, two SRS resources of the same SRS resource set, used for sounding different antennas, are configured in different slots. Then, no further guard period is required.

In example 2b, four SRS resources from the same SRS resource set are transmitted in different slots. These resources are 1-port for the case of 1 transmitter/4 receivers (1T4R) and a different antenna port is mapped to a different resource.

UL Power Control

Setting output power levels of transmitters of base stations in the downlink and mobile stations in the uplink is commonly referred to as power control (PC). Objectives of PC include improved capacity, coverage, improved system robustness, and reduced power consumption.

In LTE, PC mechanisms can be categorized in to the groups (i) open-loop, (ii) closed-loop, and (iii) combined open and closed loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In systems with multiple channels between the terminals and the base stations, e.g., traffic and control channels, different power control principles may be applied to the different channels. Using different principles yields more freedom in adapting the power control principle to the needs of individual channels. The drawback is increased complexity of maintaining several power control principles.

SRS Power Control in NR

In 3GPP technical standard TS 38.213 (V15.0.1), the SRS power control for NR is specified in section 7, which specifies how to derive $P_{srsb,f,c}(i,q_s,l)$ which can be described as the "output" from the UL power control framework; this is the intended output power that should be used by the WD to conduct SRS transmission. When performing SRS transmission it is specified that:

For SRS, the linear value $\hat{P}_{SRS,f,c}(i,q_s,l)$ of the transmit power$P_{SRS,b,f,c}(i,q_s,l)$ on UL bandwidth part (BWP) b of carrier f of serving cell c is split equally across the configured antenna ports for SRS.

If a WD transmits SRS on UL BWP b of carrier f of serving cell c using SRS power control adjustment state with index l, the WD may determine the SRS transmission power $P_{SRS,f,c}(i,q_s,l)$ in SRS transmission period i as

SUMMARY

The current specification for how to use $P_{SRSb,f,c}(i,q_s,l)$ when performing a transmission is ambiguous since it states that the power $P_{SRSb,f,c}(i,q_s,l)$ should be split equally across the "configured antenna ports for SRS" which is not defined. "Configured antenna ports for SRS" could for instance be interpreted as the number of SRS antenna ports in an SRS resource set $q_s$, the number of SRS antenna ports in the corresponding SRS resource, the number of SRS antenna ports transmitting in a given OFDM symbol, or the number of SRS ports transmitted in time interval i.

Furthermore, in NR there are several use cases for SRS and these use cases have behaviors that are not considered by the current specification:

When SRS is used for antenna switching the antenna ports may be transmitted in different transmission intervals i.

In NR, a repetition factor can be configured to the SRS, the result being that an antenna port is transmitted in multiple OFDM symbols.

The SRS resources from an SRS resource set may be transmitted in the same or different OFDM symbols. Hence, the ports in an SRS resource set may or may not be distributed over multiple OFDM symbols.

Therefore, the statement that the transmission power should be equally split across configured antenna ports is not clear, as it is not defined which antenna ports are intended. Different SRS configurations and different SRS use cases imply different possibilities, e.g., how many antenna ports that transmit SRS in a same OFDM symbol of the SRS transmission period.

Some embodiments advantageously provide methods, network nodes, and wireless devices for sounding reference signal (SRS) power control in New Radio (NR). According to some aspects, some embodiments implement one or more of the following rules:

relate the SRS power $P_{SRSb,f,c}(i,q_s,l)$ to SRS resource sets and/or SRS resources;

analyze the number of SRS antenna ports being transmitted in an OFDM symbol and split the power over these ports;

analyze the number of SRS resources being transmitted in an OFDM symbol and split the power over these resources;

analyze the number of SRS resource sets being transmitted in an OFDM symbol and split the power over these SRS resource sets; and/or ensure that the same SRS power $P_{SRSb,f,c}(i,q_s,l)$ is used for transmitting an SRS resource set/SRS resource even when the SRS resource set/SRS resource is transmitted in different transmission periods i.

According to one aspect, a WD configured to communicate with a network node includes processing circuitry configured to receive signaling from the network node that identifies a first sounding reference signal, SRS, configuration defining an SRS resource set comprising one or more SRS resources. The processing circuitry is also configured to determine a first transmission power intended for SRS transmission, the determining being based at least in part on the first SRS configuration. The processing circuitry is further configured to determine a second transmission power $$P_{SRSb,,f,c}(i, q_s, l) = \min\left\{ \begin{array}{l} P_{CMAX,f,c}(i), \\ P_{O\_SRSb,f,c}(q_s) + 10\log_{10}(2^\mu \cdot M_{SRSb,,f,c}(i)) + \alpha_{SRS,b,f,c}(q_s) \cdot PL_{b,f,c}(q_s) + h_{b,f,c}(i, l) \end{array} \right\}$$

for at least one antenna port related to the SRS resource set based on the first transmission power and according to a rule dependent on the first SRS configuration. The processing circuitry is further configured to transmit SRS on the at least one antenna port with the second transmission power.

According to this aspect, in some embodiments, the rule comprises determining the antenna ports of the SRS resource set that are used for SRS transmission in one OFDM symbol and splitting the first transmission power over the determined antenna ports. In some embodiments, the rule comprises determining the SRS resources of the SRS resource set that are used for SRS transmission in one OFDM symbol and splitting the first transmission power over antenna ports of the determined SRS resources. In some embodiments, the rule comprises determining the antenna ports of the SRS resource set and splitting the first transmission power over the determined antenna ports. In some embodiments, the rule comprises determining the antenna ports of an SRS resource within an SRS resource set and splitting the first transmission power over the determined antenna ports. In some embodiments, the rule is further dependent on the use of the SRS resource set as defined by a parameter of the first SRS configuration. In some embodiments, the received signaling from the network node (16) identifies at least one further SRS configuration defining at least one further SRS resource set, and wherein the rule is dependent also on the at least one further SRS configuration. In some embodiments, the rule is dependent on the number of SRS resource sets that are used for SRS transmission. In some embodiments, the rule is dependent on the number of SRS resource sets that are used for SRS transmission in one OFDM symbol.

According to another aspect, a WD configured to communicate with a network node, the WD includes processing circuitry configured to receive signaling from the network node that identifies a first sounding reference signal, SRS, configuration defining an SRS resource set comprising one or more SRS resources. The processing circuitry is also configured to determine a first transmission power intended for SRS transmission by the WD, wherein the determining is based at least in part on the first SRS configuration. The processing circuitry is further configured to determine a second transmission power for at least one antenna port related to the SRS resource set based on the first transmission power and based on the use of the SRS resource set as defined by a parameter of the first SRS configuration. The processing circuitry is further configured to transmit SRS on the at least one antenna port related to the SRS resource set with the second transmission power.

According to yet another aspect, a method in a WD configured to communicate with a network node, includes receiving signaling from the network node that identifies a first sounding reference signal, SRS, configuration defining an SRS resource set comprising one or more SRS resources. The method also includes determining a first transmission power intended for SRS transmission, the determining being based at least in part on the first SRS configuration. The method further includes determining a second transmission power for at least one antenna port related to the SRS resource set based on the first transmission power and according to a rule dependent on the first SRS configuration. The method also includes transmitting SRS on the at least one antenna port with the second transmission power.

According to the aspect, in some embodiments, the rule comprises determining the antenna ports of the SRS resource set that are used for SRS transmission in one OFDM symbol and splitting the first transmission power over the determined antenna ports. In some embodiments, the rule comprises determining the SRS resources of the SRS resource set that are used for SRS transmission in one OFDM symbol and splitting the first transmission power over antenna ports of the determined SRS resources. In some embodiments, the rule comprises determining the antenna ports of the SRS resource set and splitting the first transmission power over the determined antenna ports. In some embodiments, the rule comprises determining the antenna ports of an SRS resource within an SRS resource set and splitting the first transmission power over the determined antenna ports. In some embodiments, the rule is further dependent on the use of the SRS resource set as defined by a parameter of the first SRS configuration. In some embodiments, the received signaling from the network node (16) identifies at least one further SRS configuration defining at least one further SRS resource set, and wherein the rule is dependent also on the at least one further SRS configuration. In some embodiments, the rule is dependent on the number of SRS resource sets that are used for SRS transmission. In some embodiments, the rule is dependent on the number of SRS resource sets that are used for SRS transmission in one OFDM symbol.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart illustrating exemplary methods implemented in a communication system including a host computer, a network node and a wireless device for receiving user data from the wireless device at a host computer according to some embodiments of the present disclosure;

FIG. 12 is a flowchart illustrating exemplary methods implemented in a communication system including a host computer, a network node and a wireless device for receiving user data at a host computer according to some embodiments of the present disclosure;

DETAILED DESCRIPTION

Figure 1:
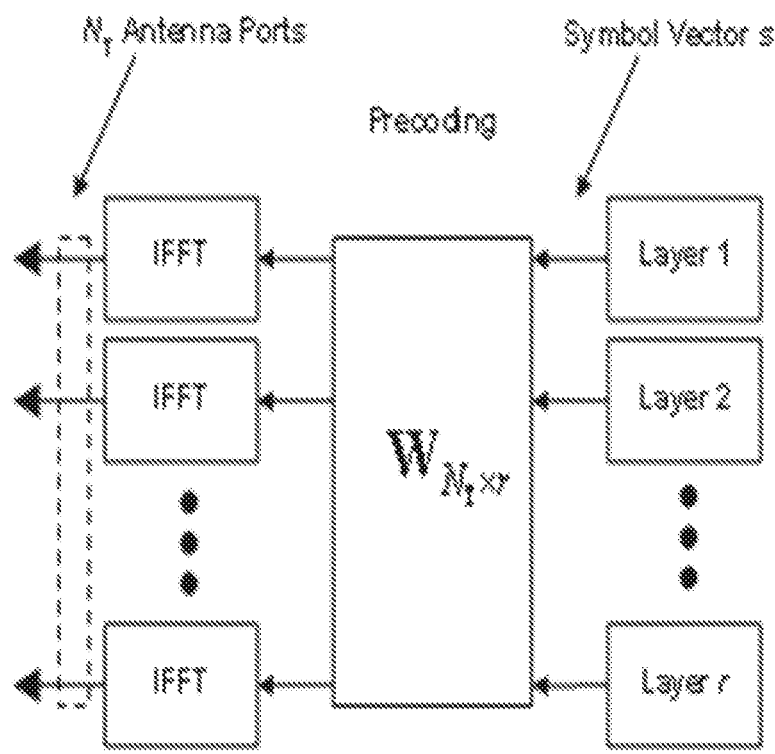
FIG. 1 is a block diagram of a spatial multiplexing operation.
Figure 2:
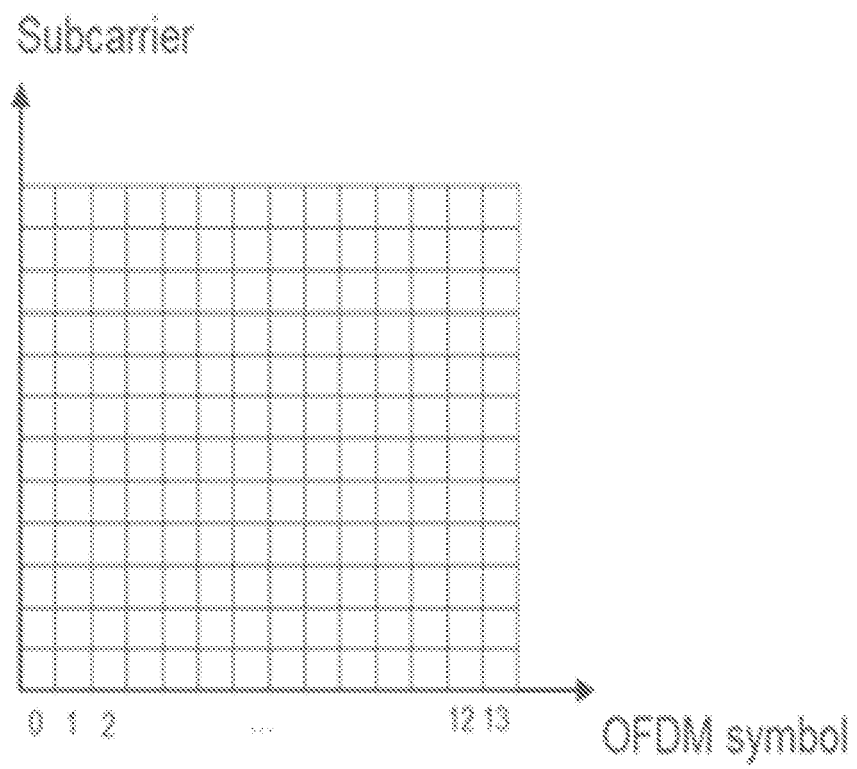
FIG. 2 illustrates a set of physical resources.
Figure 3:
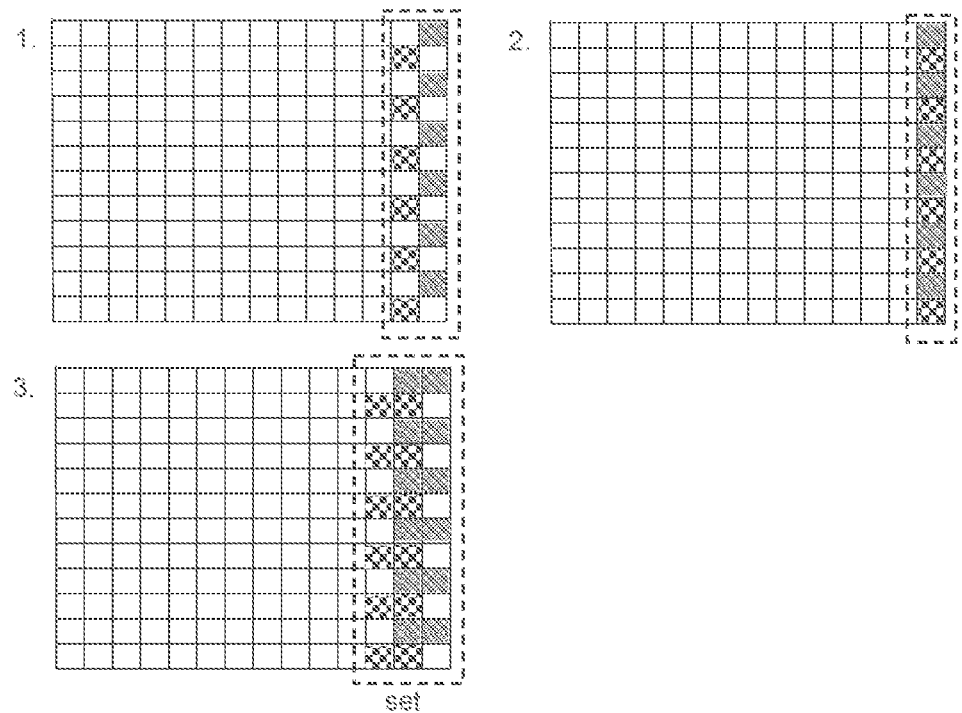
FIG. 3 illustrates SRS resource sets for codebook configurations.
Figure 4:
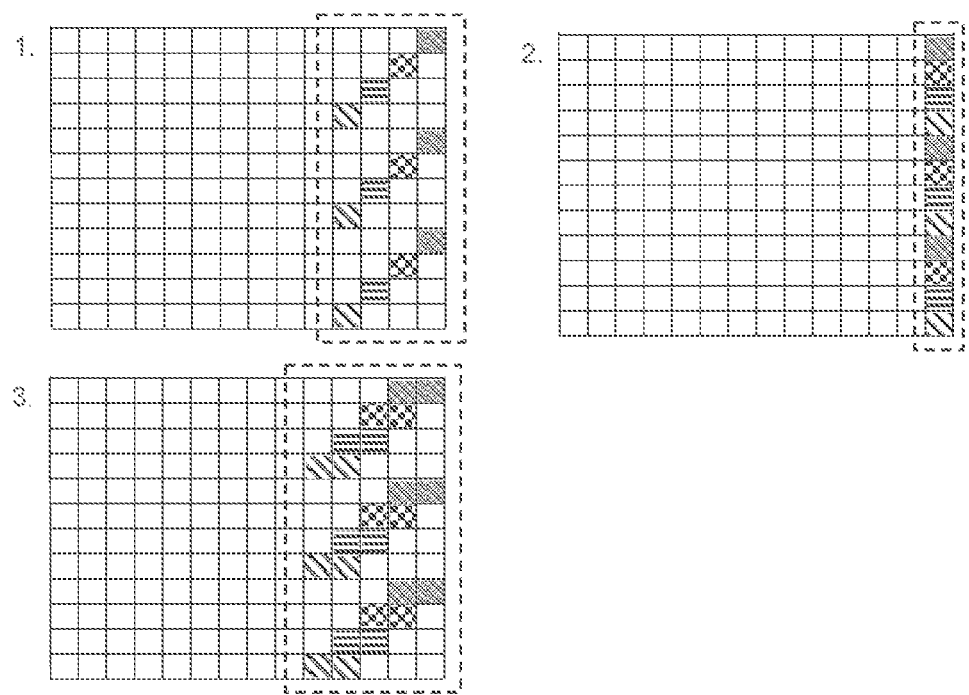
FIG. 4 illustrates a configuration of SRS resources for non-codebook configurations.
Figure 5:
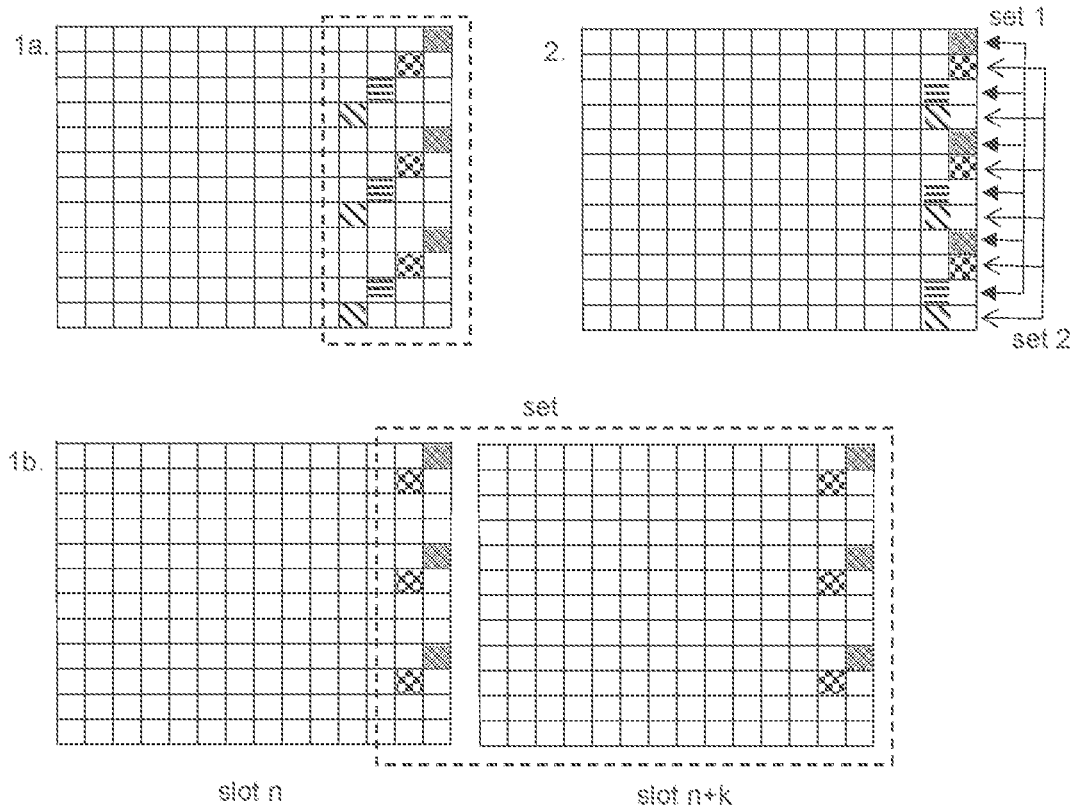
FIG. 5 illustrates a configuration of SRS resources for beam management configurations.
Figure 6:
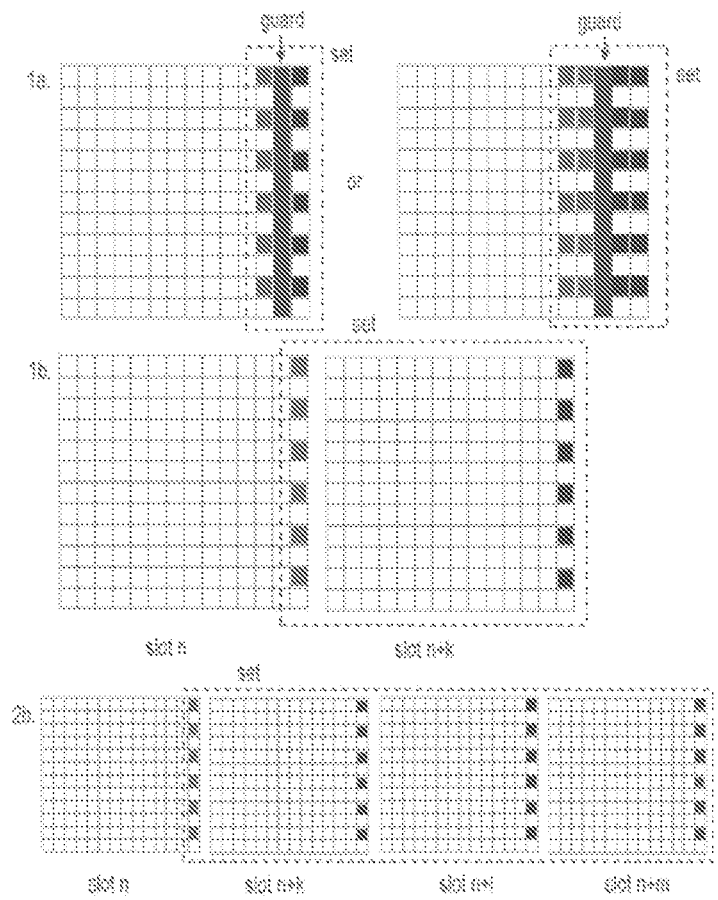
FIG. 6 illustrates a configuration of SRS resources of an alternative embodiment where knowledge of an entire downlink MIMU channel matrix is to be obtained.

Before describing in detail exemplary embodiments, it is noted that the embodiments reside primarily in combinations of apparatus components and processing steps related to sounding reference signal (SRS) power control in New Radio (NR). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc. These terms/abbreviations may be used according to 3GPP standard language, in particular according to LTE.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide methods, network nodes, and wireless devices for sounding reference signal (SRS) power control in New Radio (NR). According to one aspect, a wireless device (WD) is configured to receive signaling from the network node that identifies a first sounding reference signal, SRS, configuration. The wireless device determines a first transmission power, P1, based at least in part on the SRS configuration and determines a first set of N SRS antenna ports based at least in part on the SRS configuration, where N is an integer. The wireless device is further configured to allocate the first transmission power P1 among the first set of antenna ports for transmission by the first set of antenna ports.

Figure 7:
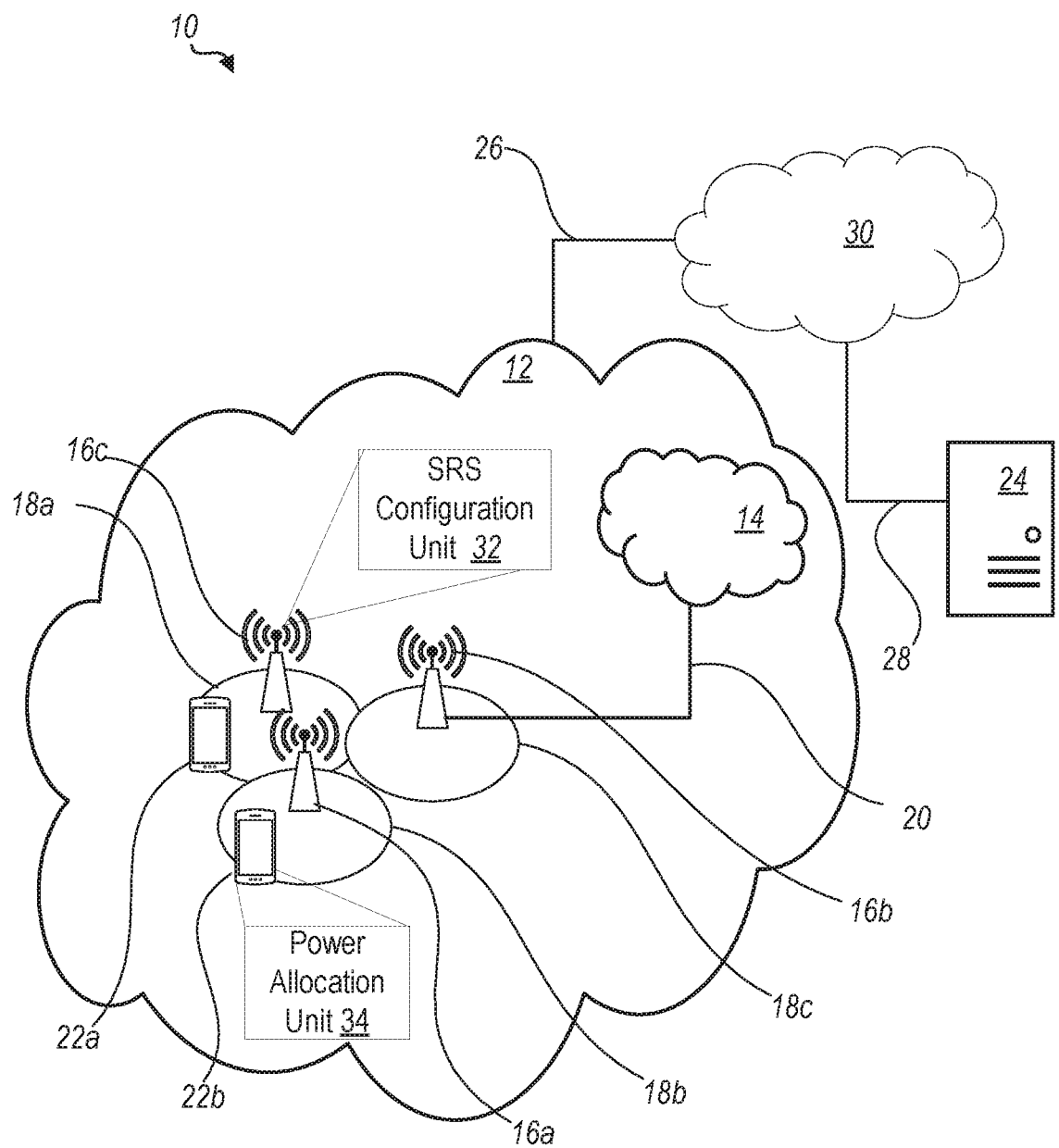
FIG. 7 is a schematic diagram of an exemplary network architecture illustrating a communication system connected via an intermediate network to a host computer according to the principles in the present disclosure.

Returning again to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 6c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an SRS configuration unit 32 which is configured to generate a sounding reference signal, SRS, configuration. A wireless device 22 is configured to include a power allocation unit 34 which is configured to allocate a first transmission power among a first set of N SRS antenna ports for transmission by the first set of N SRS antenna ports, where N is an integer.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include SRS Configuration unit 32 which is configured to generate a sounding reference signal, SRS, configuration.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 of the WD 22 may be formed as or may include, for example, one or more RF transmitters, one or more RF receivers, and/or one or more RF transceivers, as well as one or more antennas with antenna ports for radiating signals and receiving signals radiated by antennas of radio interface 62 of the network node 16.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a power allocation unit 34 which is configured to allocate a first transmission power among a first set of N SRS antenna ports for transmission by the first set of N SRS antenna ports.

Figure 8:
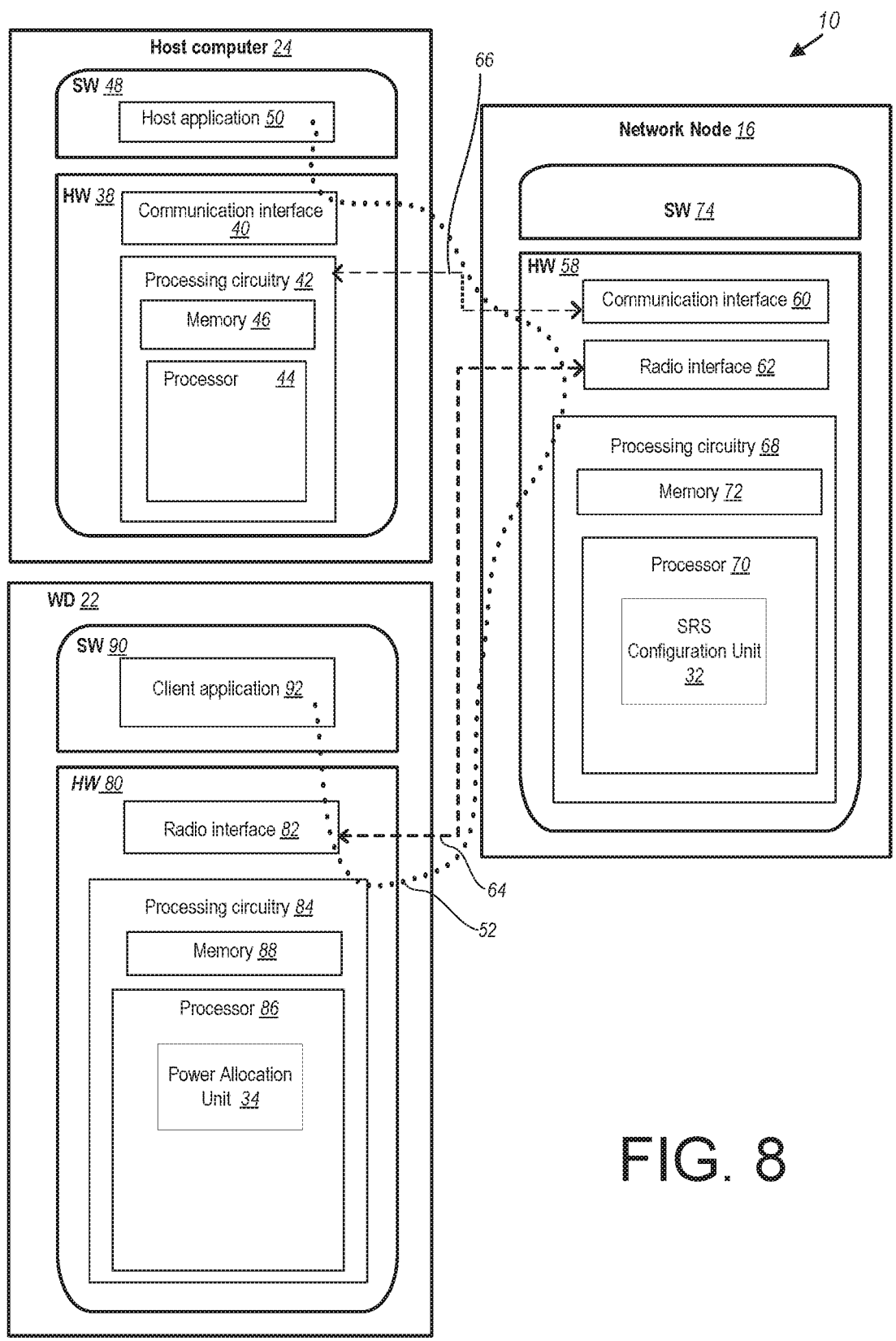
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as SRS configuration unit 32, and power allocation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 9:
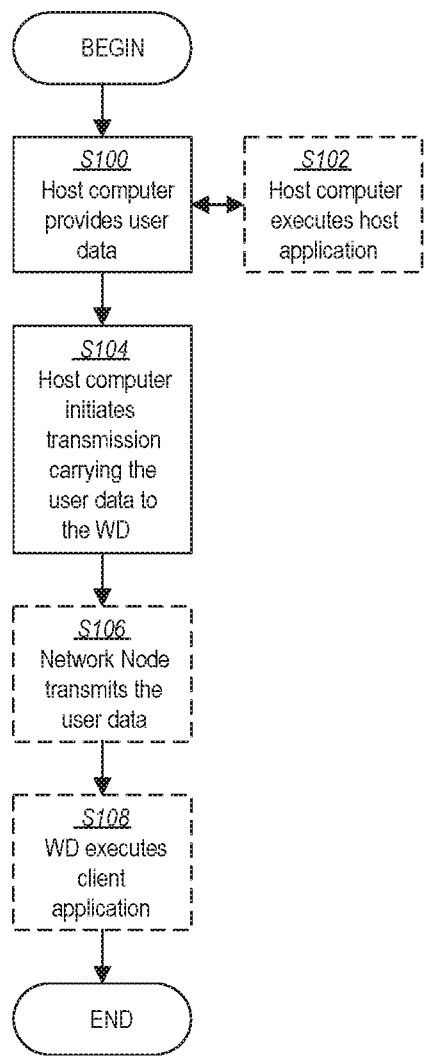
FIG. 9 is a flowchart illustrating exemplary methods implemented in a communication system including a host computer, a network node and a wireless device for executing a client application at a wireless device according to some embodiments of the present disclosure.

FIG. 9 is a flowchart illustrating an exemplary method implemented in a communication system, such as, for example, the communication system of FIGS. 7 and 8, in accordance with one embodiment. The communication system may include a host computer 24, a network node 16 and a WD 22, which may be those described with reference to FIG. 8. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 50 executed by the host computer 24 (block S108).

Figure 10:
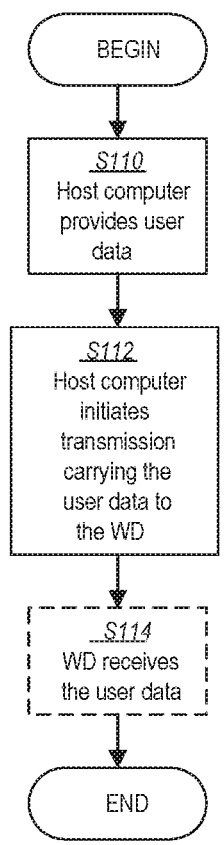
FIG. 10 is a flowchart illustrating exemplary methods implemented in a communication system including a host computer, a network node and a wireless device for receiving user data at a wireless device according to some embodiments of the present disclosure.

FIG. 10 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 11 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, the WD 22 receives input data provided by the host computer 24 (block S116). In an optional substep of the first step, the WD 22 executes the client application 92, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 92 (block S122). In providing the user data, the executed client application 92 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 12 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 13:
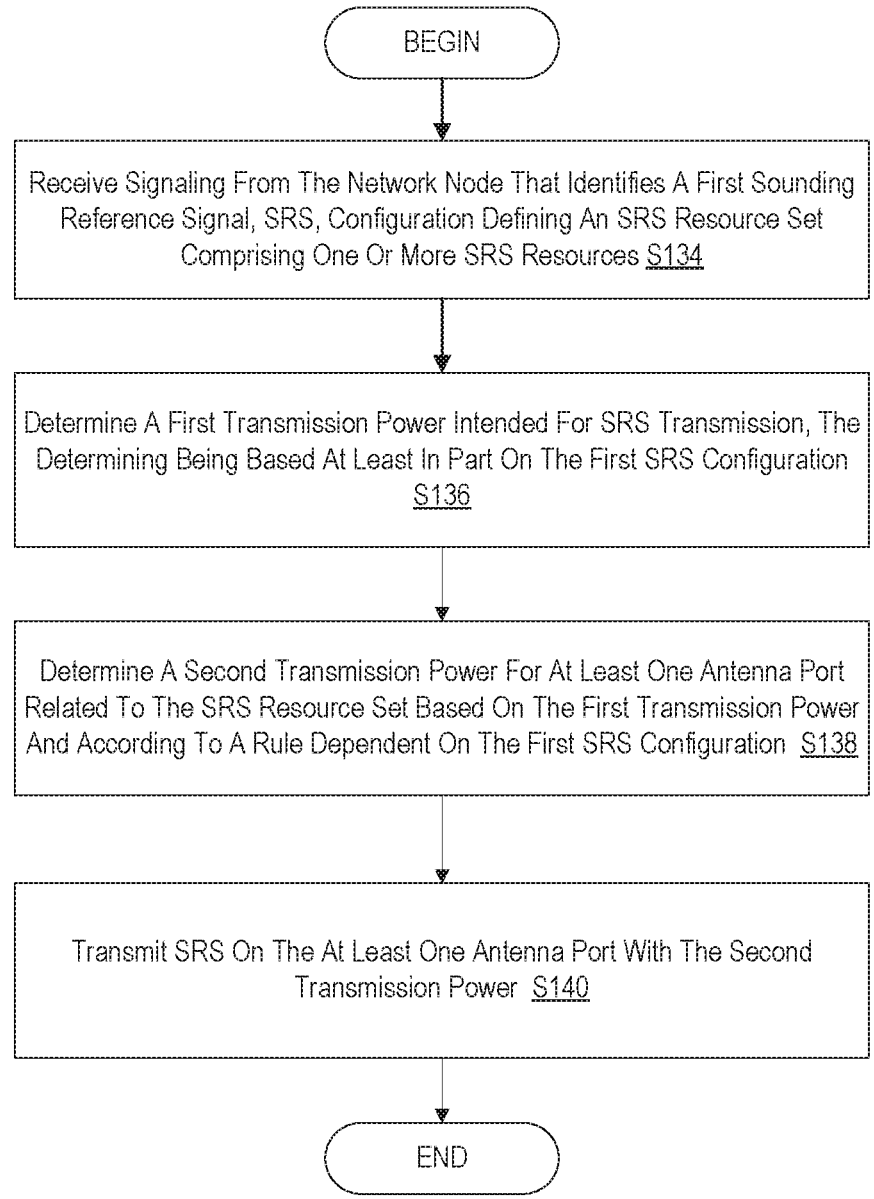
FIG. 13 is a flowchart of an exemplary process in a wireless device for sounding reference signal (SRS) power control in New Radio (NR) according to some embodiments of the present disclosure.

FIG. 13 is a flowchart of an exemplary process in a wireless device 22 for sounding reference signal (SRS) power control in New Radio (NR) according to some embodiments of the present disclosure. One or more blocks described herein may be performed by one or more elements of wireless device 22 such as by one or more of processing circuitry 84 (including the power allocation unit 34), processor 86, radio interface 82 and/or communication interface 60. Wireless device 22 such as via processing circuitry 84 and/or processor 86 and/or radio interface 82 is configured to receive signaling from the network node (16) that identifies a first sounding reference signal, SRS, configuration defining an SRS resource set comprising one or more SRS resources (Block S134). The process includes determine a first transmission power intended for SRS transmission, the determining being based at least in part on the first SRS configuration (Block S136). The process further includes determine a second transmission power for at least one antenna port related to the SRS resource set based on the first transmission power and according to a rule dependent on the first SRS configuration (Block S138). The process also includes transmit SRS on the at least one antenna port with the second transmission power (Block S140).

Having described the general process flow of arrangements of the disclosure and having provided examples of hardware and software arrangements for implementing the processes and functions of the disclosure, the sections below provide details and examples of arrangements for implementing the disclosure and for scheduling for sounding reference signal (SRS) power control (PC) in New Radio (NR).

The following embodiments are examples based on principles set forth herein. $\hat{P}_{SRS,f,c}(i,q_s,l)$ is the linear value of the transmit power $P_{SRS,b,f,c}(i,q_s,l)$ on UL BWP b of carrier f of serving cell c.

Embodiment 1

In one embodiment, $\hat{P}_{SRS,f,c}(i,q_s,l)$ may be split by the power allocation unit 34 over the antenna ports of the radio interface 82 of the WD 22 within an SRS resource. In other words, for SRS, the linear value $\hat{P}_{SRS,f,c}(i,q_s,l)$ of the transmit power $P_{SRS,b,f,c}(i,q_s,l)$ on UL BWP b of carrier f of serving cell c may be split equally across the configured antenna ports of the radio interface 82 within the SRS resource. The linear value of the transmit power may be determined by the power allocation unit 34 of the processor 86 of the WD 22.

Embodiment 2

In one embodiment, $\hat{P}_{SRS,f,c}(i,q_s,l)$ may be split via the power allocation unit 34 over the antenna ports of the radio interface 82 within an SRS resource set. In other words, for SRS, the linear value $\hat{P}_{SRS,f,c}(i,q_s,l)$ of the transmit power $P_{SRS,b,f,c}(i,q_s,l)$ on UL BWP b of carrier f of serving cell c may be split equally across the configured antenna ports within the SRS resource set $q_s$. The linear value of the transmit power may be determined by the power allocation unit 34 of the processor 86.

Embodiment 3

In one embodiment, let
- N be the number of SRS resources from the SRS resource set $q_s$ that is transmitted per ODFM symbol; and
- M be the number of antenna ports of the radio interface 82 per SRS resource within the SRS resource set $q_s$ and then split the power so that each antenna port transmits the power.

Using the above definition of N and M, for SRS, each antenna port of the radio interface 82 within the SRS resource set $q_s$ may be transmitted with the power $$\frac{1}{MN}$$

$\hat{P}_{SRS,f,c}(i,q_s,l)$ is the linear value of the transmit power $P_{SRS,b,f,c}(i,q_s,l)$ on UL BWP b of carrier f of serving cell c, transmit power being determined by the power allocation unit 34 of the processor 86 of the WD 22.

In one such embodiment, SRS configurations corresponding to an SRS resource set where an unequal number of ports being transmitted per OFDM are prohibited. Hence, the SRS resource set could only be configured in such a way that a constant number of NM of ports are transmitted on each OFDM symbol.

Embodiment 4

In one embodiment, each antenna port of the radio interface 82 of the WD 22 within an SRS resource set $q_s$ may transmit with the power $\beta \hat{P}_{SRS,f,c}(i,q_s,l)$ where $\beta$ is the largest possible coefficient such that for every OFDM symbol where the SRS resource set $q_s$ is transmitted, the total power from the transmitted SRS resource set may be less than or equal to $\hat{P}_{SRS,f,c}(i,q_s,l)$. The value of $\beta \hat{P}_{SRS,f,c}(i,q_s,l)$ may be computed by the power allocation unit 34 of the processor 86 of the WD 22.

In one such embodiment, let
- Nmax($q_s$) be the maximal number of SRS resources, corresponding to a certain SRS resource set $q_s$ that is transmitted at the same ODFM symbol; and
- M ($q_s$) be the number of antenna ports of the radio interface 82 per SRS resource within the SRS resource set $q_s$; and from these let $$\beta = \frac{1}{M(q_s) N max(q_s)},$$

where $\beta$ may be computed by the power allocation unit 34 of the processor 86.

In another embodiment, a value R may be defined as the maximal number of antenna ports that transmit in the same ODFM symbol for a certain SRS resource set $q_s$ and let $\beta = 1/R$.

Embodiment 5

In one embodiment, each antenna port of the radio interface 82 within an SRS resource set may transmit with the power $\beta \hat{p}_{SRS,f,c}(i,q_s,l)$ where $\beta$ is given from $$\beta = \frac{1}{M(q_s)Nmax(q_s)Q(q_s)}$$

as may be computed by the power allocation unit 34 of the processor 86 and where:

Nmax($q_s$) is the maximal number of SRS resources, corresponding to a certain SRS resource set $q_s$, that is transmitted at the same ODFM symbol;

M ($q_s$) is the number of antenna ports per SRS resource within the SRS resource set $q_s$; and Q($q_s$) is the number of SRS resource sets transmitted in the set of OFDM symbols used for transmitting SRS resource set $q_s$. In another embodiment, Q($q_s$) is instead the maximum number of SRS resource sets transmitted simultaneously (hence, on the same OFDM symbol) in the OFDM symbols used by SRS resource set $q_s$.

Embodiment 6

In one embodiment, the SRS resource set may be transmitted in multiple transmission periods i, i+1, i+2 etc. In such an embodiment, $\hat{P}_{SRS,f,c}(i,q_s,l)$, corresponding to the first transmission period i of the SRS resource set $q_s$, is used for all the transmission periods i, i+1, i+2 for the given SRS resource set.

In one embodiment, the SRS resource may be transmitted in multiple transmission periods i, i+1, i+2 etc. In such an embodiment, $\hat{P}_{SRS,f,c}(i,q_s,l)$, as may be computed by the power allocation unit 34 of the processor 86, corresponding to the first transmission period i of the SRS resource may be used for all the transmission periods i, i+1, i+2 for the given SRS resource.

Embodiment 7

In one embodiment $\hat{P}_{SRS,f,c}(i,q_s,l)$ is split to the antenna ports of the radio interface 82 within the SRS resource in different ways depending on the higher layer parameter SRS-Set Use which is part of the SRS-Config information element (IE), where. the SRS-Config IE is used to configure sounding reference signal transmissions. The configuration defines a list of SRS-Resources and a list of SRS-Resource-Sets. Each resource set defines a set of SRS-Resources. The network triggers the transmission of the set of SRS-Resources using a configured aperiodic SRS-ResourceTrigger (L1 DCI). The higher layer parameter, SRS-Set Use, defines a use of SRS resources. The use of SRS resources may be for measurements for codebook-based UL multiple input multiple output (MIMO), non-codebook-based UL MIMO, beam management, or antenna switching.

Hence, some of the above embodiments may be used for a certain configuration whereas some other embodiments may be applied for another configuration.

According to one aspect, a WD 22 configured to communicate with a network node 16 includes processing circuitry configured to receive signaling from the network node 16 that identifies a first sounding reference signal, SRS, configuration defining an SRS resource set comprising one or more SRS resources. The processing circuitry is also configured to determine a first transmission power intended for SRS transmission, the determining being based at least in part on the first SRS configuration. The first transmission power is related to the SRS power control for New Radio. As noted above, the SRS power control specifies how to derive $P_{SRS,b,f,c}(i,q_s,l)$ which can be described as the "output" from the UL power control framework. This is the intended output power that may be used by the WD to conduct SRS transmission. The first transmission power corresponds to $P_{SRS,b,f,c}(i,q_s,l)$ or the linear value of P. The processing circuitry is further configured to determine a second transmission power for at least one antenna port related to the SRS resource set based on the first transmission power and according to a rule dependent on the first SRS configuration. A rule may be as described above in the Summary and with respect to Embodiments 1-7. The second transmission power may correspond to the determined transmission power per antenna port that is used for the actual SRS transmission. The processing circuitry is further configured to transmit SRS on the at least one antenna port with the second transmission power.

According to this aspect, in some embodiments, the rule comprises determining the antenna ports of the SRS resource set that are used for SRS transmission in one OFDM symbol and splitting the first transmission power over the determined antenna ports. In some embodiments, the rule comprises determining the SRS resources of the SRS resource set that are used for SRS transmission in one OFDM symbol and splitting the first transmission power over antenna ports of the determined SRS resources. In some embodiments, the rule comprises determining the antenna ports of the SRS resource set and splitting the first transmission power over the determined antenna ports. In some embodiments, the rule comprises determining the antenna ports of an SRS resource within an SRS resource set and splitting the first transmission power over the determined antenna ports. In some embodiments, the rule is further dependent on the use of the SRS resource set as defined by a parameter of the first SRS configuration. This parameter is the higher layer parameter SRS-SetUse discussed above. In some embodiments, the received signaling from the network node (16) identifies at least one further SRS configuration defining at least one further SRS resource set, and wherein the rule is dependent also on the at least one further SRS configuration. In some embodiments, the rule is dependent on the number of SRS resource sets that are used for SRS transmission. In some embodiments, the rule is dependent on the number of SRS resource sets that are used for SRS transmission in one OFDM symbol.

According to another aspect, a WD 22 configured to communicate with a network node 16, the WD 22 includes processing circuitry configured to receive signaling from the network node 16 that identifies a first sounding reference signal, SRS, configuration defining an SRS resource set comprising one or more SRS resources. The processing circuitry is also configured to determine a first transmission power intended for SRS transmission by the WD, wherein the determining is based at least in part on the first SRS configuration. The processing circuitry is further configured to determine a second transmission power for at least one antenna port related to the SRS resource set based on the first transmission power and based on the use of the SRS resource set as defined by a parameter of the first SRS configuration. The processing circuitry is further configured to transmit SRS on the at least one antenna port related to the SRS resource set with the second transmission power.

According to yet another aspect, a method in a WD, 22 configured to communicate with a network node 16, includes receiving signaling from the network node 16 that identifies a first sounding reference signal, SRS, configuration defining an SRS resource set comprising one or more SRS resources. The method also includes determining a first transmission power intended for SRS transmission, the determining being based at least in part on the first SRS configuration. The method further includes determining a second transmission power for at least one antenna port related to the SRS resource set based on the first transmission power and according to a rule dependent on the first SRS configuration. The method also includes transmitting SRS on the at least one antenna port with the second transmission power.

According to the aspect, in some embodiments, the rule comprises determining the antenna ports of the SRS resource set that are used for SRS transmission in one OFDM symbol and splitting the first transmission power over the determined antenna ports. In some embodiments, the rule comprises determining the SRS resources of the SRS resource set that are used for SRS transmission in one OFDM symbol and splitting the first transmission power over antenna ports of the determined SRS resources. In some embodiments, the rule comprises determining the antenna ports of the SRS resource set and splitting the first transmission power over the determined antenna ports. In some embodiments, the rule comprises determining the antenna ports of an SRS resource within an SRS resource set and splitting the first transmission power over the determined antenna ports. In some embodiments, the rule is further dependent on the use of the SRS resource set as defined by a parameter of the first SRS configuration. In some embodiments, the received signaling from the network node (16) identifies at least one further SRS configuration defining at least one further SRS resource set, and wherein the rule is dependent also on the at least one further SRS configuration. In some embodiments, the rule is dependent on the number of SRS resource sets that are used for SRS transmission. In some embodiments, the rule is dependent on the number of SRS resource sets that are used for SRS transmission in one OFDM symbol.

Thus, in some embodiments, a network node 16 is configured to generate a sounding reference signal, SRS, configuration identifying a first set of antenna ports and specifying a first power allocation to be applied at the WD 22, and transmit the SRS configuration to the WD 22. According to this aspect, in some embodiments, the first power allocation is equally split over the first set of antenna ports. In some embodiments, the first set of antenna ports corresponds to all antenna ports within a SRS resource. In some embodiments, the first set of antenna ports corresponds to all antenna ports within a SRS resource set. In some embodiments, the SRS configuration identifies a second set of antenna ports that correspond to a set of antenna ports within an SRS resource set that, at least in part, are specified to be used for transmission in a given orthogonal frequency division multiplex, OFDM, symbol. In some embodiments, the SRS configuration identifies a second set of antenna ports and wherein a second transmission power is specified to be equally split over the second set of antenna ports. In some embodiments, the second set of antenna ports corresponds to a maximal number of antenna ports from an SRS resource set that, at least in part, are transmitted in a given orthogonal frequency division multiplex, OFDM, symbol that belongs to a set of OFDM symbols used for transmitting the SRS resource set. In some embodiments, the second set of antenna ports correspond to antenna ports from multiple SRS resource sets. In some embodiments, the network node 16 identifies a second SRS configuration. In some embodiments, a second transmission power P/Q is specified to be equally split over the second set of antenna ports, where Q is based on a number of SRS resource sets transmitted in a given orthogonal frequency division multiplex, OFDM, symbol. In some embodiments, the first transmission power and the second transmission power are specified to be applied to multiple transmission periods for an SRS resource set. In some embodiments, the first transmission power and the second transmission power are specified to be applied to multiple transmission periods for an SRS resource.

According to another aspect, a method in a network node 16 includes generating a sounding reference signal, SRS, configuration identifying a first set of antenna ports and specifying a first power allocation to be applied at the WD 22, and transmitting the SRS configuration to the WD 22.

According to another aspect, a wireless device (WD) 22 is configured to receive signaling from the network node 16 that identifies a first sounding reference signal, SRS, configuration, the SRS configuration identifying a first set of antenna ports, The WD 22 is further configured to allocate a first transmission power among the first set of antenna ports for transmission by the first set of antenna ports. According to this aspect, in some embodiments, the first transmitted power is equally split over the first set of antenna ports. In some embodiments, the first set of antenna ports corresponds to all antenna ports within a SRS resource. In some embodiments, the first set of antenna ports corresponds to all antenna ports within a SRS resource set. In some embodiments, the SRS configuration identifies a second set of antenna ports that correspond to a set of antenna ports within an SRS resource set that, at least in part, are used for transmission in a given orthogonal frequency division multiplex, OFDM, symbol. In some embodiments, the SRS configuration identifies a second set of antenna ports and wherein a second transmission power is equally split over the second set of antenna ports. In some embodiments, the second set of antenna ports corresponds to a maximal number of antenna ports from an SRS resource set that, at least in part, are transmitted in a given orthogonal frequency division multiplex, OFDM, symbol that belongs to a set of OFDM symbols used for transmitting the SRS resource set. In some embodiments, the second set of antenna ports correspond to antenna ports from multiple SRS resource sets. In some embodiments, the WD 22 is further configured to receive signaling from the network node 16 that identifies a second SRS configuration. In some embodiments, a second transmission power P/Q is equally split over the second set of antenna ports, where Q is based on a number of SRS resource sets transmitted in a given orthogonal frequency division multiplex, OFDM, symbol. In some embodiments, the first transmission power and the second transmission power are applied to multiple transmission periods for an SRS resource set. In some embodiments, the first transmission power and the second transmission power are applied to multiple transmission periods for an SRS resource. In some embodiments, configurations of an SRS resource set where an unequal number of ports being transmitted per OFDM are prohibited. In some embodiments, a determination of a second transmission power from the first transmission power will depend on a higher layer parameter, SRS-SetUse.

According to yet another embodiment, a method implemented in a WD 22 includes receiving signaling from the network node 16 that identifies a first sounding reference signal, SRS, configuration, the SRS configuration identifying a first set of antenna ports, and allocating a first transmission power among the first set of antenna ports for transmission by the first set of antenna ports.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node, the WD comprising processing circuitry configured to:
   receive signaling from the network node that identifies a first sounding reference signal, SRS, configuration defining an SRS resource set comprising one or more SRS resources;
   determine a first transmission power intended for SRS transmission, the determining being based at least in part on the first SRS configuration;
   determine a second transmission power for at least one antenna port related to the SRS resource set based on the first transmission power and according to a rule dependent on the first SRS configuration; and
   transmit SRS on the at least one antenna port with the second transmission power,
      wherein the rule is further dependent on use of the SRS resource set as defined by a parameter of the first SRS configuration, the parameter comprising a higher layer parameter SRS-Set Use,
      wherein the SRS resource is transmitted in multiple transmission periods, and
      wherein a transmission power corresponding to a first transmission period of the SRS resource is used for all the transmission periods for the SRS resource.

2. The WD of claim 1, wherein the rule comprises determining the antenna ports of the SRS resource set that are used for SRS transmission in one OFDM symbol and splitting the first transmission power over the determined antenna ports.

3. The WD of claim 1, wherein the rule comprises determining the SRS resources of the SRS resource set that are used for SRS transmission in one OFDM symbol and splitting the first transmission power over antenna ports of the determined SRS resources.

4. The WD of claim 1, wherein the rule comprises determining the antenna ports of the SRS resource set and splitting the first transmission power over the determined antenna ports.

5. The WD of claim 1, wherein the rule comprises determining the antenna ports of an SRS resource within an SRS resource set and splitting the first transmission power over the determined antenna ports.

6. The WD of claim 1, wherein the received signaling from the network node identifies at least one further SRS configuration defining at least one further SRS resource set, and wherein the rule is dependent also on the at least one further SRS configuration.

7. The WD of claim 6, wherein the rule is dependent on a number of SRS resource sets that are used for SRS transmission.

8. The WD of claim 6, wherein the rule is dependent on a number of SRS resource sets that are used for SRS transmission in one OFDM symbol.

9. A method implemented in a wireless device, WD, configured to communicate with a network node, the method comprising:
receiving signaling from the network node that identifies a first sounding reference signal, SRS, configuration defining an SRS resource set comprising one or more SRS resources;
determining a first transmission power intended for SRS transmission, the determining being based at least in part on the first SRS configuration;
determining a second transmission power for at least one antenna port related to the SRS resource set based on the first transmission power and according to a rule dependent on the first SRS configuration; and
transmitting SRS on the at least one antenna port with the second transmission power,
wherein the rule is further dependent on use of the SRS resource set as defined by a parameter of the first SRS configuration, the parameter comprising a higher layer parameter SRS-Set Use,
wherein the SRS resource is transmitted in multiple transmission periods, and
wherein a transmission power corresponding to a first transmission period of the SRS resource is used for all the transmission periods for the SRS resource.

10. The method of claim 9, wherein the rule comprises determining the antenna ports of the SRS resource set that are used for SRS transmission in one OFDM symbol and splitting the first transmission power over the determined antenna ports.

11. The method of claim 9, wherein the rule comprises determining the SRS resources of the SRS resource set that are used for SRS transmission in one OFDM symbol and splitting the first transmission power over antenna ports of the determined SRS resources.

12. The method of claim 9, wherein the rule comprises determining the antenna ports of the SRS resource set and splitting the first transmission power over the determined antenna ports.

13. The method of claim 9, wherein the rule comprises determining the antenna ports of an SRS resource within an SRS resource set and splitting the first transmission power over the determined antenna ports.

14. The method of claim 9, wherein the received signaling from the network node identifies at least one further SRS configuration defining at least one further SRS resource set, and wherein the rule is dependent also on the at least one further SRS configuration.

15. The method of claim 14, wherein the rule is dependent on a number of SRS resource sets that are used for SRS transmission.

16. The method of claim 14, wherein the rule is dependent on a number of SRS resource sets that are used for SRS transmission in one OFDM symbol.

17. A non-transitory, computer readable medium storing computer-executable instructions that, when executed by at least one processor of a wireless device, WD, configure the WD to perform a method for communicating with a network node, the method comprising:
receiving signaling from the network node that identifies a first sounding reference signal, SRS, configuration defining an SRS resource set comprising one or more SRS resources;
determining a first transmission power intended for SRS transmission, the determining being based at least in part on the first SRS configuration;
determining a second transmission power for at least one antenna port related to the SRS resource set based on the first transmission power and according to a rule dependent on the first SRS configuration; and
transmitting SRS on the at least one antenna port with the second transmission power,
wherein the rule is further dependent on use of the SRS resource set as defined by a parameter of the first SRS configuration, the parameter comprising a higher layer parameter SRS-Set Use,
wherein the SRS resource is transmitted in multiple transmission periods, and
wherein a transmission power corresponding to a first transmission period of the SRS resource is used for all the transmission periods for the SRS resource.

18. The WD of claim 1, wherein the higher layer parameter SRS-SetUse defines a use of SRS resources for measurements of at least one of codebook-based uplink (UL) multiple input multiple output (MIMO), non-codebook-based UL MIMO, beam management and antenna switching.

* * * * *